United States Patent
Huang et al.

(10) Patent No.: US 11,988,553 B2
(45) Date of Patent: May 21, 2024

(54) OPTICAL MODULE

(71) Applicant: Advanced Semiconductor Engineering, Inc., Kaohsiung (TW)

(72) Inventors: Kuo Sin Huang, Kaohsiung (TW); Tien-Chia Liu, Kaohsiung (TW); Ko-Fan Tsai, Kaohsiung (TW); Cheng-Te Chou, Kaohsiung (TW); Yan-Te Chou, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 17/949,145

(22) Filed: Sep. 20, 2022

(65) Prior Publication Data
US 2024/0094052 A1    Mar. 21, 2024

(51) Int. Cl.
G01J 1/44    (2006.01)
G01J 1/42    (2006.01)

(52) U.S. Cl.
CPC ......... *G01J 1/44* (2013.01); *G01J 2001/4247* (2013.01); *G01J 2001/444* (2013.01)

(58) Field of Classification Search
CPC . G01J 1/44; G01J 2001/4247; G01J 2001/444
USPC ........................................................ 250/206
See application file for complete search history.

(56) References Cited

U.S. PATENT DOCUMENTS

| 11,132,975 B1 * | 9/2021 | Rodriguez, II ....... G02F 1/1336 |
| 2016/0344162 A1 * | 11/2016 | Konno ................. B23K 26/705 |
| 2017/0118455 A1 * | 4/2017 | Cho ...................... G01S 7/4814 |

\* cited by examiner

*Primary Examiner* — Thanh Luu
*Assistant Examiner* — Mai Thi Ngoc Tran
(74) *Attorney, Agent, or Firm* — FOLEY & LARDNER LLP

(57) ABSTRACT

An optical module is disclosed. The optical module includes a carrier, an optical emitter disposed over the carrier, and a monitor disposed over the carrier and configured to adjust a property of a first light emitted from the optical emitter.

9 Claims, 13 Drawing Sheets

OPTICAL MODULE

BACKGROUND

1. Technical Field

The present disclosure relates to an optical module.

2. Description of the Related Art

An optical module may incorporate one or more optical emitters to emit light beams, to generate images, and/or to provide optical information. In high power applications (such as smart phones, smart glasses, head mounted displays (HMDs), and the like), unexpected direct radiation from the light beams into the eyes may be harmful. In addition, for distance measuring applications (such as a light detecting and ranging (LiDAR) or other detectors for optically detecting an object), a compensation mean to compensate for ageing effects may be needed. Therefore, approaches that monitor the luminous flux (or luminous power or brightness) of the optical emitter may be useful.

SUMMARY

In some arrangements, an optical module includes a carrier, an optical emitter disposed over the carrier, and a monitor disposed over the carrier and configured to adjust a property of a first light emitted from the optical emitter.

In some arrangements, an optical module includes an optical emitter configured to emit a first light and an optical receiver configured to receive a second light and generate an electrical signal for controlling the optical emitter. The second light is a part of the first light.

In some arrangements, an optical module includes an optical emitter configured to emit a first light and a first optical receiver configured to receive a reflected light of the first light from an object and generate a first signal. The optical module also includes a monitor configured to adjust a property of the first light emitted from the optical emitter based on the first signal generated by the first optical receiver.

BRIEF DESCRIPTION OF THE DRAWINGS

Aspects of some arrangements of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
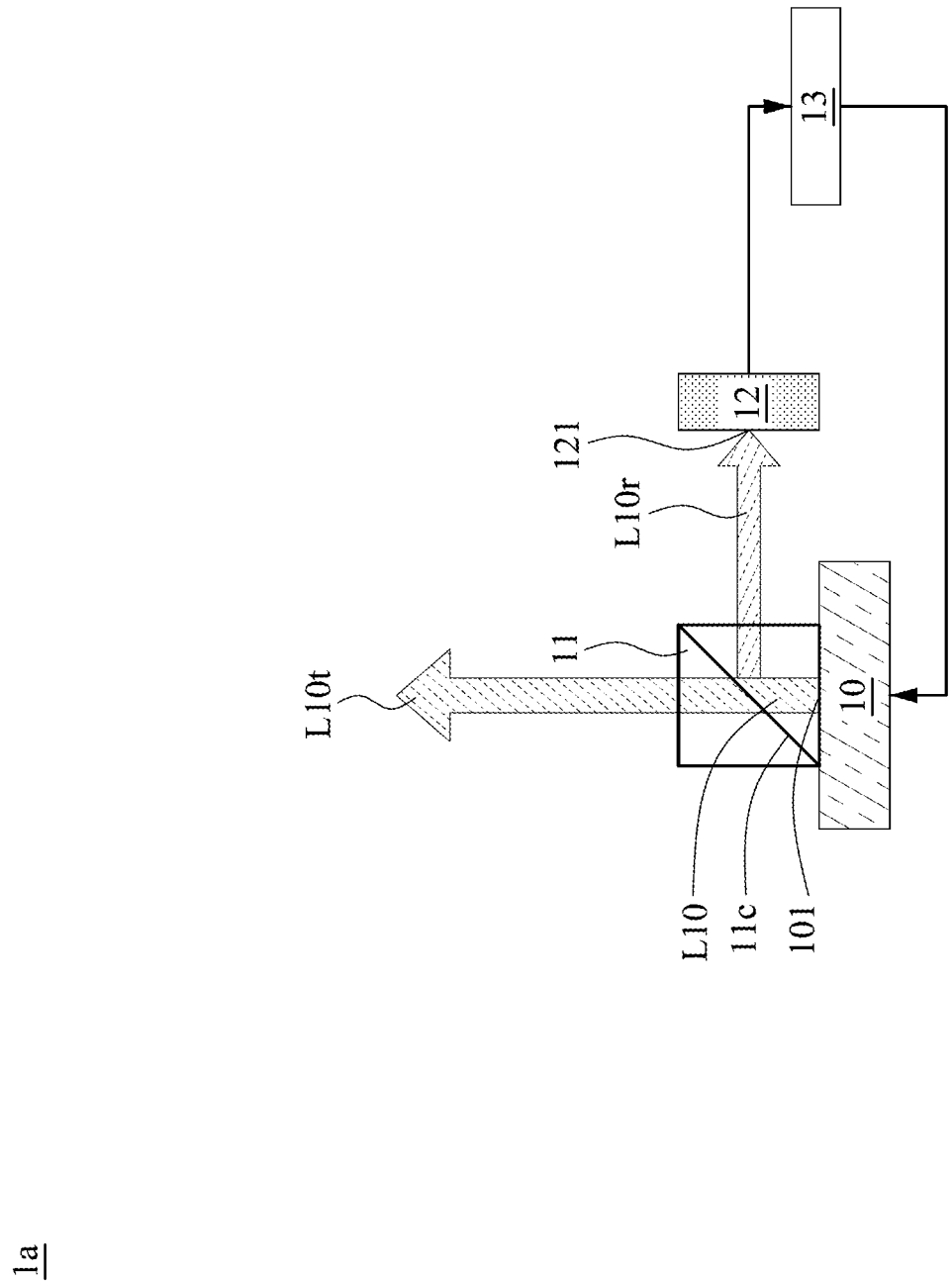
FIG. 1A illustrates a conceptual view of an optical module in accordance with some arrangements of the present disclosure.

The following disclosure provides for many different arrangements, or examples, for implementing different features of the provided subject matter. Specific examples of components and arrangements are described as follows to explain certain aspects of the present disclosure. These are, of course, merely examples and are not intended to be limiting. For example, the formation of a first feature over or on a second feature in the description that follows may include arrangements in which the first and second features are formed or disposed in direct contact, and may also include arrangements in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various arrangements and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of arrangements of this disclosure are not deviated from by such arrangement.

FIG. 1A illustrates a conceptual view of an optical module 1a in accordance with some arrangements of the present disclosure. The optical module 1a may include an optical emitter 10, an optical component 11, an optical receiver 12, and a controller 13.

The optical emitter 10 may be configured to generate light or other electromagnetic radiation in the ultraviolet, visible, and/or infrared spectral regions, illustrated as a light beam L10.

The optical emitter 10 may include a light emitting diode (LED), a laser diode (such as vertical cavity surface-emitting laser (VCSEL)), a lamp, a laser, any other suitable light source, or a combination thereof. For example, the optical emitter 10 may include a light source that emits visible light of one or more wavelengths (or frequencies, or bandwidths), such as red, blue, and green light. In some other arrangements, the optical emitter 10 may include a light source that emits invisible light of one or more wavelengths (or frequencies, or bandwidths), such as infrared light. The optical emitter 10 may include an active surface 101 and the light beam L10 may be emitted from the active surface 101.

The optical emitter 10 may include any number of light sources, such as an array of pixels. For example, the optical emitter 10 in FIG. 4A includes three light sources or pixels 10a, 10b, and 10c.

In addition, although a singular light beam L10 is illustrated in FIG. 1A, the optical emitter 10 may emit more than one light beam concurrently, sequentially, or periodically. For example, multiple light beams may be emitted concurrently, sequentially, or periodically from different locations on the active surface 101 of the optical emitter 10. For example, three light beams L10a, L10b, and L10c are respectively emitted from the light sources 10a, 10b, and 10c of the optical emitter 10 in FIG. 4A.

The optical component 11 may be disposed over or on the optical emitter 10. The optical component 11 may be disposed in front of the active surface 101 of the optical emitter 10. The optical component 11 may be disposed in the propagation path of the light beam L10.

The optical component 11 may include a beam splitter, such as a polarization beam splitter (PBS). The optical component 11 may have a cube shape. The optical component 11 may include triangular glass prisms which are glued (using an index-matched adhesive, such as polyester, epoxy, or urethane-based adhesive) together at their base and having a coating 11c in between. However, a beam splitter of any shape or size can be acceptable. In some arrangements, the optical component 11 may include one or more surfaces for receiving input light beams (such as the light beam L10) and one or more surfaces for transmitting output light beams (such as the light beams L10t and L10r).

The optical component 11 may be configured to split or divide an input light beam (such as the light beam L10) into two or more output light beams (such as the light beams L10t and L10r). For example, the optical component 11 may be configured to receive an input light beam and radiate two or more output light beams. For example, a proportion or percentage of the input light beam may be transmitted through the optical component 11 and another proportion or percentage of the input light beam may be reflected toward the optical receiver 12. The proportion or percentage of the light transmission and reflection may be adjusted by, for example, the characteristics (such as the thickness, the material, the coverage, etc.) of the coating 11c of the optical component 11. For example, the radiant energy per unit time of the light beam L10t and the radiant energy per unit time of the light beam L10r may be adjusted by the characteristics of the coating 11c of the optical component 11. In some arrangements, the coating 11c may include a dielectric coating, a metallic coating, or a combination thereof.

In some arrangements, the proportion or percentage of the luminous flux of the light beams L10, L10t and L10r may be constant. For example, 1 percent of the radiant energy per unit time of the light beam L10 may be reflected and 99 percent thereof may be transmitted. For example, 10 percent of the radiant energy per unit time of the light beam L10 may be reflected and 90 percent thereof may be transmitted. For example, 50 percent of the radiant energy per unit time of the light beam L10 may be reflected and 50 percent thereof may be transmitted.

In some arrangements, the optical component 11 may be configured to split an input light beam into two or more output light beams based on polarization, such that each output light beam has a different polarization state.

For example, for an unpolarized input light beam, the optical component 11 may split it into two light beams of orthogonal polarization states. For a polarized input light beam having both p-polarized and s-polarized light, the optical component 11 may pass one polarization and reflect the other. For an input light beam that is already either p-polarized or s-polarized, the optical component 11 may be used to selectively pass or reflect the polarized input light beam.

In some arrangements, any two of the light beams L10, L10t and L10r may be different in one or more properties, such as luminous flux (or luminous power, or brightness), luminous intensity, propagation direction, wavelength (or frequency, or bandwidth), polarization state, etc.

In some arrangements, any two of the light beams L10, L10t and L10r may have the same propagation direction, the same wavelength (or frequency, or bandwidth), the same polarization state, etc.

Based on different applications of the optical module 1a, the light beam (such as the light beam L10t) transmitted through the optical component 11 may be received by (or may radiate) a target or an object (not illustrated in FIG. 1A). For example, for display applications shown in FIGS. 4A thru 4D, the light beam transmitted through the optical component 11 may be received by a scanning member. For LiDAR applications shown in FIGS. 5A and 5B, the light beam transmitted through the optical component 11 may radiate all or part of any suitable object that is moving or stationary relative to the optical module (or a LiDAR system). In some other arrangements, the light beam transmitted through the optical component 11 may radiate an optical sensitive organ (such as eyes), another optical receiver, etc.

The optical receiver 12 may be disposed laterally with respect to the optical component 11 and the optical emitter 10. The optical receiver 12 may be disposed in the propagation path of the light beam (such as the light beam L10r) reflected from the optical component 11.

The optical receiver 12 may be configured to receive the light beam L10r and generate electrical signals (e.g., an electrical current) to the controller 13. For example, the optical receiver 12 may convert light energy in the form of photons into an electric current. The electrical signals may be related to one or more properties of the light beam L10r, such as luminous flux (or luminous power or brightness), luminous intensity, propagation direction, wavelength (or frequency, or bandwidth), polarization state, etc.

The optical receiver 12 may include a photo-detector, a photo-sensor, a photodiode (PD), a charge-coupled device (CCD), photomultiplier tube, a camera, or another light-sensitive electronic device.

In some arrangements, the optical receiver 12 may be used individually. In some other arrangements, the optical receiver 12 may be used in combination with a processor (e.g., a processor 43 in FIG. 4A), such as a spectrum chip, a silicon-photonic chip, silicon-based integrated circuits, etc. In some other arrangements, the optical receiver 12 may be used in combination with a filter (e.g., a filter 44 in FIG. 4B), such as an optical bandpass filter, a polarization filter, a spectrally selectively transparent component, etc. In some other arrangements, the optical receiver 12 may be used in combination with a processor and a filter.

For example, a processor or a filter may pass (or be transparent to) light beams having one or more predetermined wavelengths (or wavelengths of interest) and block the other. Therefore, a proportion or percentage of the light beam L10r may be received by the optical receiver 12 and another proportion or percentage of the light beam L10r may be blocked. In some arrangements, by using the processor and/or the filter to restrict light beams received by the optical receiver 12, insertion loss may be decreased, sensibility may be improved, and stability may be increased.

The optical receiver 12 may include an active surface 121 and the light beam L10r may be received by the active surface 121. In some arrangements, multiple light beams may be concurrently, sequentially, or periodically received on different locations on the active surface 121 of the optical receiver 12. For example, three light beams L10ar, L10br, and L10cr are respectively received on different locations on the active surface 121 of the optical receiver 12 in FIG. 4B.

The controller 13 may be coupled to the optical emitter 10 and the optical receiver 12. The controller 13 may be electrically connected to the optical emitter 10 and the optical receiver 12. The electrical connections from the controller 13 to the optical emitter 10 and the optical receiver 12 may be established by wired connection, wireless connection, or both.

The controller 13 may control the optical emitter 10 based on the electrical signals from the optical receiver 12. Therefore, the controller 13 may control the optical emitter 10 based on one or more properties of the light beam L10r, such as luminous flux (or luminous power or brightness), luminous intensity, propagation direction, wavelength (or frequency, or bandwidth), polarization state, etc.

In some arrangements, the controller 13 and the optical receiver 12 may be configured to monitor the one or more properties of the light beam L10. In some arrangements, the controller 13 and the optical receiver 12 may be implemented by a monitor or a monitoring device. For example, the controller 13 and the optical receiver 12 may be integrated or may function together as a monitor.

For example, a threshold value (or a desired value) for the one or more properties of the light beam L10r may be predetermined. If the electrical signals from the optical receiver 12 indicate that the one or more properties exceed the threshold value, the controller 13 may generate logic or instructions to adjust or to calibrate (such as to decrease) the one or more properties of the light beam L10.

Additionally, if the electrical signals from the optical receiver 12 indicate that the one or more properties of the light beam L10r are too low (or lower than an acceptable value), the controller 13 may generate logic or instructions to adjust (such as to increase) the one or more properties of the light beam L10. In some arrangements, the controller 13 may generate logic or instructions to adjust or to calibrate the electrical current or voltage provided to the optical emitter 10, thereby monitoring and controlling the one or more properties of the light beam L10.

The controller 13 may include a processor, a central processing unit (CPU), a microprocessor unit (MPU), a graphics processing unit (GPU), a microcontroller unit (MCU), an application-specific integrated circuit (ASIC), a field-programmable gate array (FPGA), or another type of integrated circuit. The controller 13 may include logic or instructions to control the optical emitter 10. The logic implemented by the controller 13 may be embodied in software, firmware, hardware, or a combination thereof.

According to some arrangements of the present disclosure, by splitting the light beam L10 into the light beams L10t and L10r, and using the light beam L10r as a reference light beam (or a reference signal) to monitor the one or more properties of the light beam L10, the light beam L10 can be adjusted according to the light beam L10r at the appropriate time, promptly, or immediately. The one or more properties of the light beam L10 can be controlled and kept within a predetermined range. In addition, the one or more properties of the light beam (such as the light beam L10t) transmitted through the optical component 11 can be controlled and kept within a predetermined range. In addition, the one or more properties of the light beam (such as the light beam L10r) reflected by the optical component 11 can be controlled and kept within a predetermined range. The stability of the light beams L10, L10t, and L10r may be improved. Therefore, the safety and the performance of the optical module 10a can be improved.

Figure 1B:
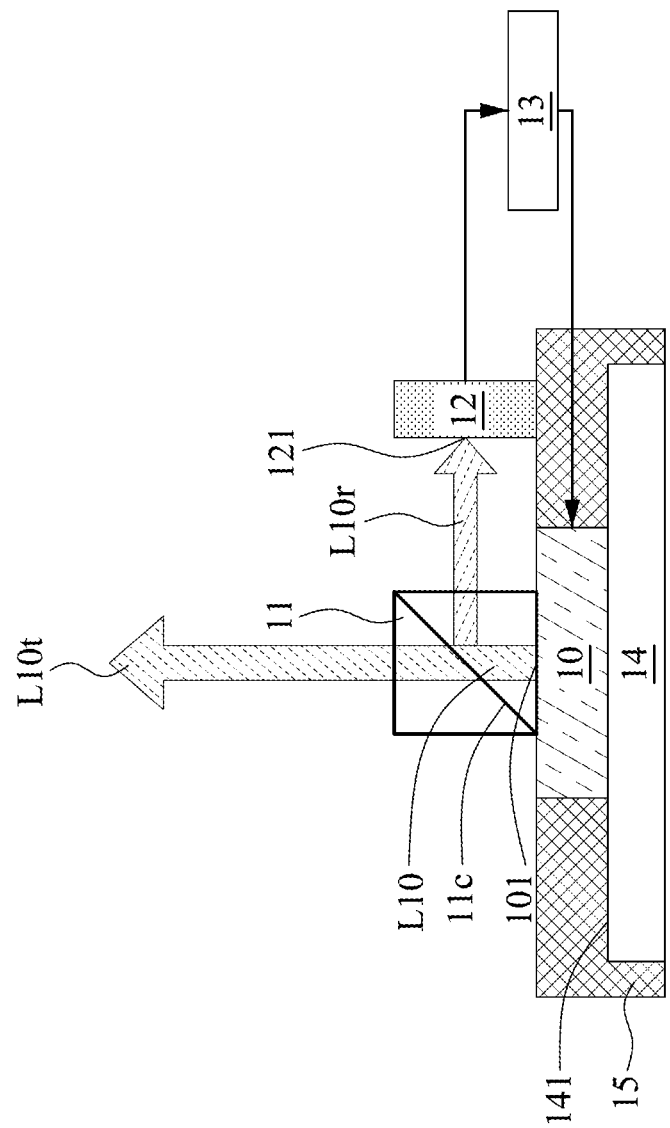
FIG. 1B illustrates a cross-sectional view of an optical module in accordance with some arrangements of the present disclosure.

FIG. 1B illustrates a cross-sectional view of an optical module 1b in accordance with some arrangements of the present disclosure. The optical module 1b is similar to the optical module 1a in FIG. 1A except that the optical module 1b further includes a carrier 14 and an encapsulant 15.

The carrier 14 may include, for example, a printed circuit board, such as a paper-based copper foil laminate, a composite copper foil laminate, or a polymer-impregnated glass-fiber-based copper foil laminate. In some arrangements, the carrier 14 may include an interconnection structure, such as a redistribution layer (RDL) or a grounding element.

In some arrangements, the carrier 14 may include a surface 141. The carrier 14 may include one or more conductive pads (not shown) in proximity to, adjacent to, or embedded in and exposed from the surface 141. The carrier 14 may include a solder resist (not shown) on the surface 141 to fully expose or to expose at least a portion of the conductive pads for electrical connections with the optical emitter 10. In some arrangements, the optical emitter 10 may be disposed over or on the surface 141 of the carrier 14. The active surface 101 of the optical emitter 10 may face away from the carrier 14.

The encapsulant 15 may be disposed over or on the surface 141 of the carrier 14. The encapsulant 15 may surround or cover lateral surfaces of the optical emitter 10. The active surface 101 of the optical emitter 10 may be at least partially exposed from the encapsulant 15. For example, an emitting region or location where the light beam L10 is outputted may be exposed from the encapsulant 15.

The optical component 11 may be disposed over or on the encapsulant 15. The optical component 11 may be at least partially exposed from the encapsulant 15. The optical component 11 may be entirely exposed from the encapsulant 15.

The optical receiver 12 may be disposed over or on the encapsulant 15. The optical receiver 12 may be at least partially exposed from the encapsulant 15. The optical receiver 12 may be entirely exposed from the encapsulant 15.

The encapsulant 15 may include an epoxy resin having fillers, a molding compound (e.g., an epoxy molding compound or other molding compound), a polyimide, a phenolic compound or material, a material with a silicone dispersed therein, or a combination thereof. In some arrangements, the encapsulant 15 may include an opaque material. In some arrangements, the opaque material may be an opaque epoxy (e.g., a black epoxy) or other opaque resin or polymer. In some arrangements, the encapsulant 15 may include a light transmissive material. In some arrangements, the light transmissive material may be a clear epoxy or other light transmissive epoxy or other resin or polymer.

Figure 1C:
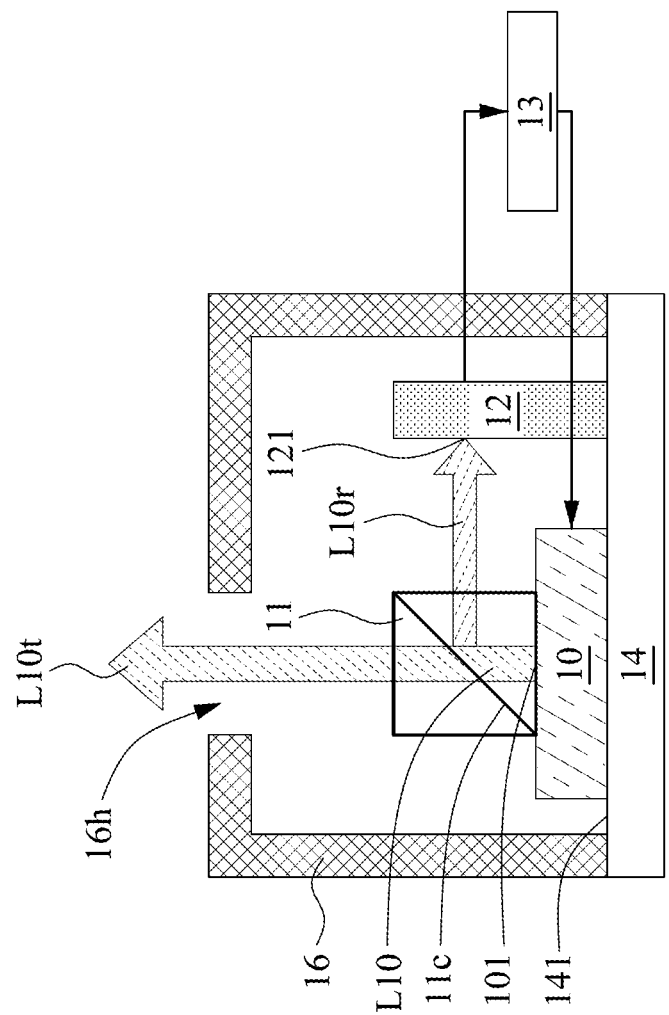
FIG. 1C illustrates a cross-sectional view of an optical module in accordance with some arrangements of the present disclosure.

FIG. 1C illustrates a cross-sectional view of an optical module 1c in accordance with some arrangements of the present disclosure. The optical module 1c is similar to the optical module 1a in FIG. 1A except that the optical module 1c further includes the carrier 14 and a protection structure 16.

Some details of the carrier 14 may correspond to the paragraphs described above for FIG. 1B, and a description thereof is not repeated hereinafter for conciseness.

The protection structure 16, the optical emitter 10, and the optical receiver 12 may be disposed over or on the surface 141 of the carrier 14. The optical component 11 may be disposed over or on the active surface 101 of the optical emitter 10.

In some arrangements, the protection structure 16 may be physically separated from the optical emitter 10, the optical component 11, and the optical receiver 12. For example, the protection structure 16 may not be in contact with the optical emitter 10, the optical component 11, and the optical receiver 12. In some arrangements, the protection structure 16 may surround the optical emitter 10, the optical component 11, and the optical receiver 12. In some arrangements, the protection structure 16 may define a space for accommodating the optical emitter 10, the optical component 11, and the optical receiver 12.

In some arrangements, the protection structure 16 may include a lid, a frame, a plate, a peripheral wall, or other structures. In some arrangements, the protection structure 16 may include a metal, a plastic, a ceramic, or other feasible materials. In some arrangements, the protection structure 16 may include an opaque material. In some arrangements, the opaque material may be an opaque epoxy (e.g., a black epoxy) or other opaque resin or polymer that does not allow the light beams L10, L10t, and/or L10r to pass through. In some arrangements, the protection structure 16 may not allow external light to pass through and to be detected by the optical receiver 12.

In some arrangements, the protection structure 16 may include an opening 16h. In some arrangements, in a direction substantially perpendicular to the surface 141 of the carrier 14, the opening 16h, a surface of the optical component 11 for outputting the light beam L10t, and an emitting region of the active surface 101 of the optical emitter 10 where the light beam L10 is outputted may be overlapped. The light beam L10t may pass through the opening 16h to propagate to a target or an object, a scanning member, eyes, another optical receiver, etc.

Figure 1D:
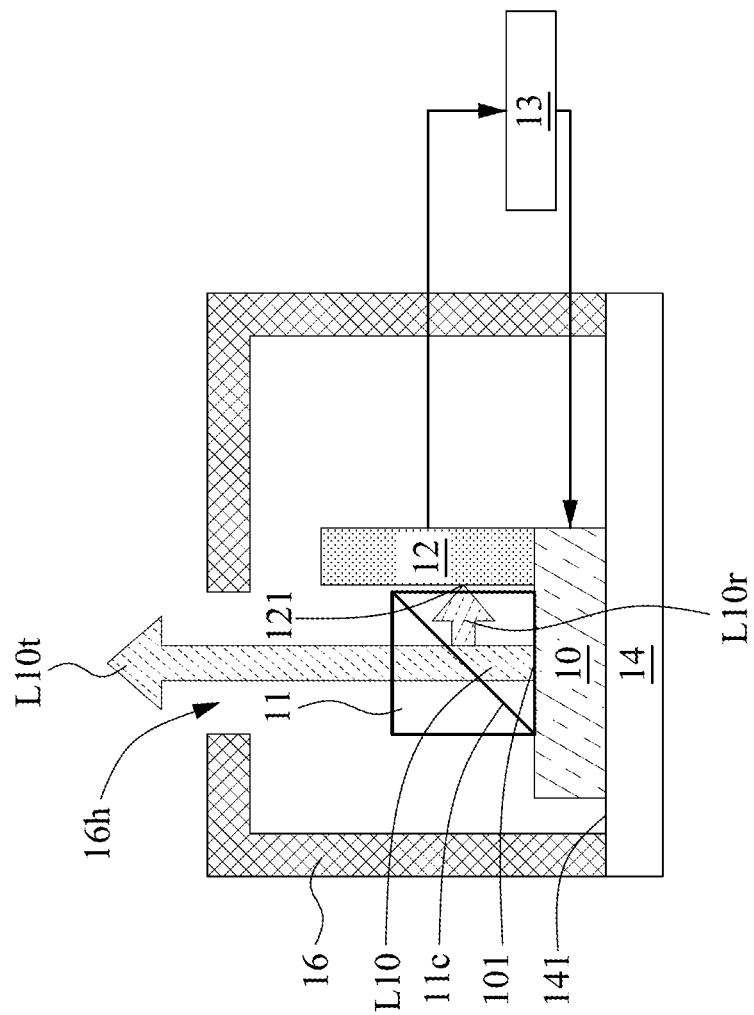
FIG. 1D illustrates a cross-sectional view of an optical module in accordance with some arrangements of the present disclosure.

FIG. 1D illustrates a cross-sectional view of an optical module 1d in accordance with some arrangements of the present disclosure. The optical module 1d is similar to the optical module 1c in FIG. 1C except for the differences described as follows.

The optical component 11 and the optical receiver 12 may both be disposed over or on the active surface 101 of the optical emitter 10. By disposing the optical receiver 12 over or on the active surface 101 of the optical emitter 10, the active surface 121 of the optical receiver 12 may be closer to the optical component 11, the package size of the optical module 1d may be decreased. In addition, the transmission path of the light beam L10r may be shorter, insertion loss may be decreased and sensibility of the optical receiver 12 may be improved.

Figure 1E:
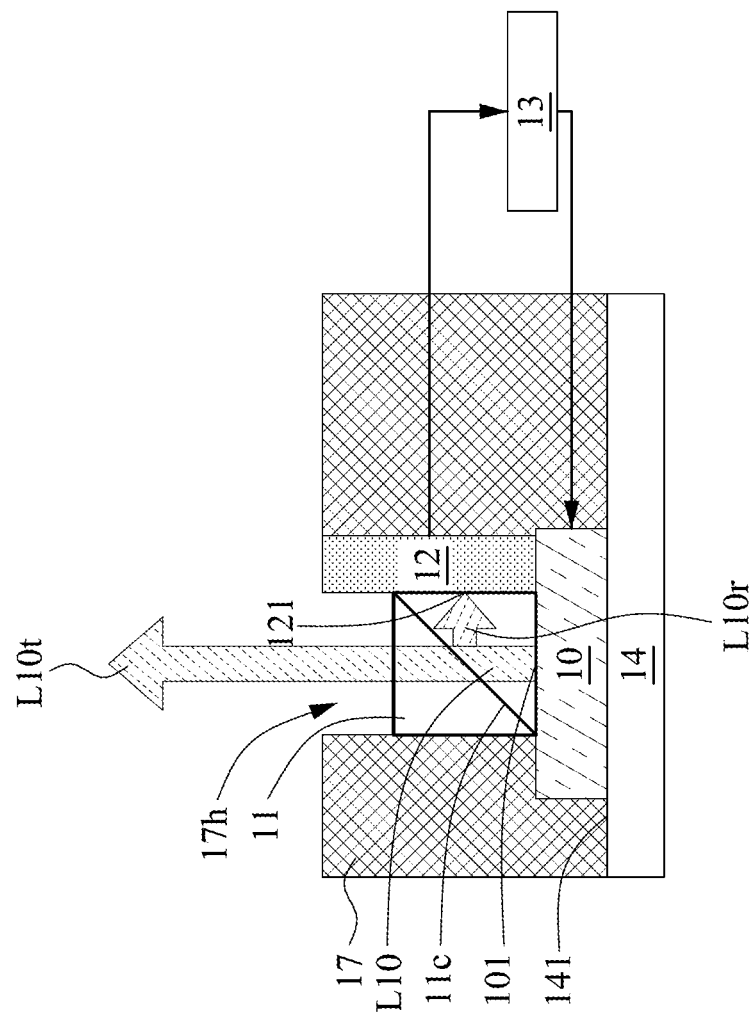
FIG. 1E illustrates a cross-sectional view of an optical module in accordance with some arrangements of the present disclosure.

FIG. 1E illustrates a cross-sectional view of an optical module 1e in accordance with some arrangements of the present disclosure. The optical module 1e is similar to the optical module 1a in FIG. 1A except that the optical module 1e further includes the carrier 14 and an encapsulant 17.

The encapsulant 17 may be similar to the encapsulant 15 of FIG. 1B. Therefore, some details of the encapsulant 17 may correspond to the paragraphs described above for FIG. 1B, and a description thereof is not repeated hereinafter for conciseness.

The encapsulant 17 may cover a part of the active surface 101 of the optical emitter 10. The encapsulant 17 may include an opening 17h exposing at least an emitting region of the optical emitter 10 where the light beam L10 is outputted. The light beam L10t may pass through the opening 17h.

The optical component 11 and the optical receiver 12 may be disposed within the opening 17h. The encapsulant 17 may surround or cover at least a surface of the optical component 11. For example, surfaces for receiving input light beams and surfaces for transmitting output light beams may be exposed from the encapsulant 17. A surface through which no light beam passes may be surrounded or covered by the encapsulant 17.

The encapsulant 17 may at least partially surround or cover the optical receiver 12. For example, the active surface 121 of the optical receiver 12 may face the optical component 11 and a backside surface (not annotated in FIG. 1E) may be surrounded or covered by the encapsulant 17. In some arrangements, the active surface 121 of the optical receiver 12 may contact the optical component 11. In some other arrangements, the active surface 121 of the optical receiver 12 may be spaced apart from the optical component 11.

Figure 2:
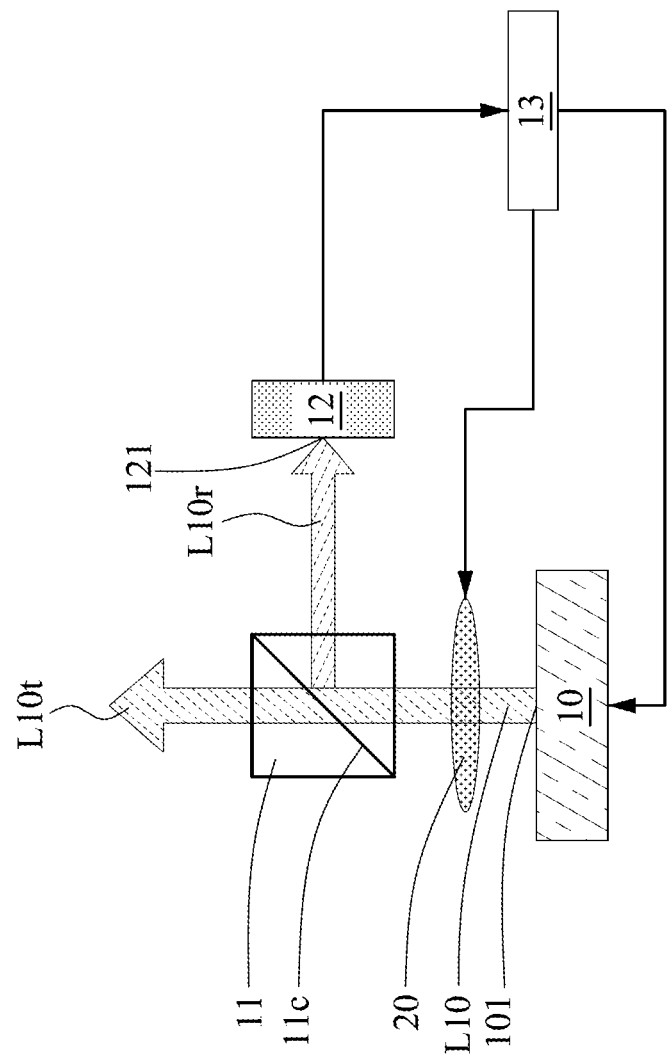
FIG. 2 illustrates a conceptual view of an optical module in accordance with some arrangements of the present disclosure.

FIG. 2 illustrates a conceptual view of an optical module 2 in accordance with some arrangements of the present disclosure. The optical module 2 is similar to the optical module 1a in FIG. 1A except that the optical module 2 further includes an optical component 20.

The optical component 20 may include a wave plate, such as a half-wave plate or a quarter-wave plate. The optical component 20 may be configured to alter the polarization state of the light beam L10.

In some arrangements, the controller 13 (or another controller or an actuator) may be configured to move (such as rotate, shift, vibrate, etc.) the optical component 20 relative to the optical emitter 10. The relative movement of the optical component 20 may change the polarization state of the light beam L10, which may in turn change the proportion or percentage of the light transmission and reflection of the optical component 11.

The relative movement of the optical component 20 may be adjusted according to the characteristics (such as the thickness, the material, the coverage, etc.) of the coating 11c of the optical component 11. In some arrangements, the relative movement of the optical component 20 may change the polarization state of the light beam L10 to achieve the total transmission of the light beam L10t or the total reflection of the light beam L10r. In some arrangements, the optical component 20 and the optical component 11 may be collectively used to change the proportion or percentage of the light transmission and reflection of the optical component 11. In some arrangements, the optical component 20 and the optical component 11 may be collectively used to keep the one or more properties of the light beam L10t within a predetermined range. In some arrangements, the optical component 20 and the optical component 11 may be collectively used to keep the one or more properties of the light beam L10r within a predetermined range.

Figure 3:
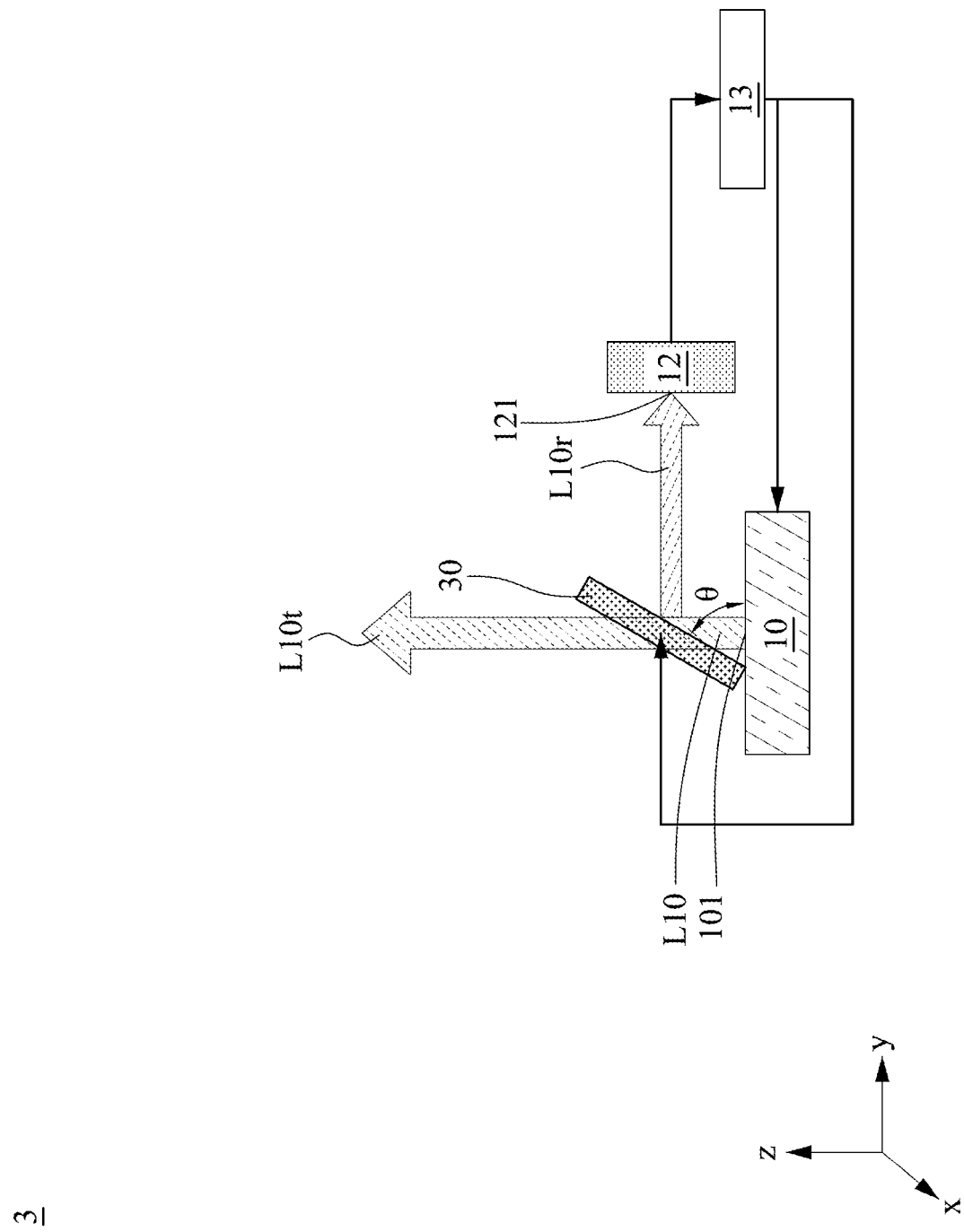
FIG. 3 illustrates a conceptual view of an optical module in accordance with some arrangements of the present disclosure.

FIG. 3 illustrates a conceptual view of an optical module 3 in accordance with some arrangements of the present disclosure. The optical module 3 is similar to the optical module 1a in FIG. 1A except for the differences described as follows.

The optical component 30 of the optical module 3 may include a beam splitter, such as a plate beam splitter or a plate-like beam-splitting element. The optical component 30 may have two parallel surfaces. The optical component 30 may be disposed over or on the active surface 101 of the optical emitter 10. The optical component 30 may define an angle θ with the active surface 101 of the optical emitter 10. In some arrangements, the angle θ may be less than 90 degrees.

Similar to the optical component 11 of the optical module 1a, a proportion or percentage of the input light beam may be transmitted through the optical component 30 and another proportion or percentage of the input light beam may be reflected toward the optical receiver 12. The proportion or percentage of the light transmission and reflection may be adjusted by, for example, the characteristics (such as the thickness, the material, the coverage, etc.) of the coating (not annotated in FIG. 3) of the optical component 30.

In some arrangements, the controller 13 (or another controller or an actuator) may be configured to move (such as rotate, shift, vibrate, etc.) the optical component 30 relative to the optical emitter 10. In some arrangements, the relative movement of the optical component 30 may change the proportion or percentage of the light transmission and reflection. In some arrangements, the relative movement of the optical component 30 may function as a switch to monitor the one or more properties of the light beam L10. For example, the optical component 30 may be moved out of the propagation path of the light beam L10 to stop the monitoring process.

For example, the optical component 30 may be moved along the x-axis, the y-axis, and/or the z-axis. The active surface 101 of the optical emitter 10 may be substantially parallel to the x-axis and the y-axis. The active surface 101 of the optical emitter 10 may be substantially perpendicular to the z-axis. In some arrangements, the angle θ may also be adjusted.

Figure 4A:
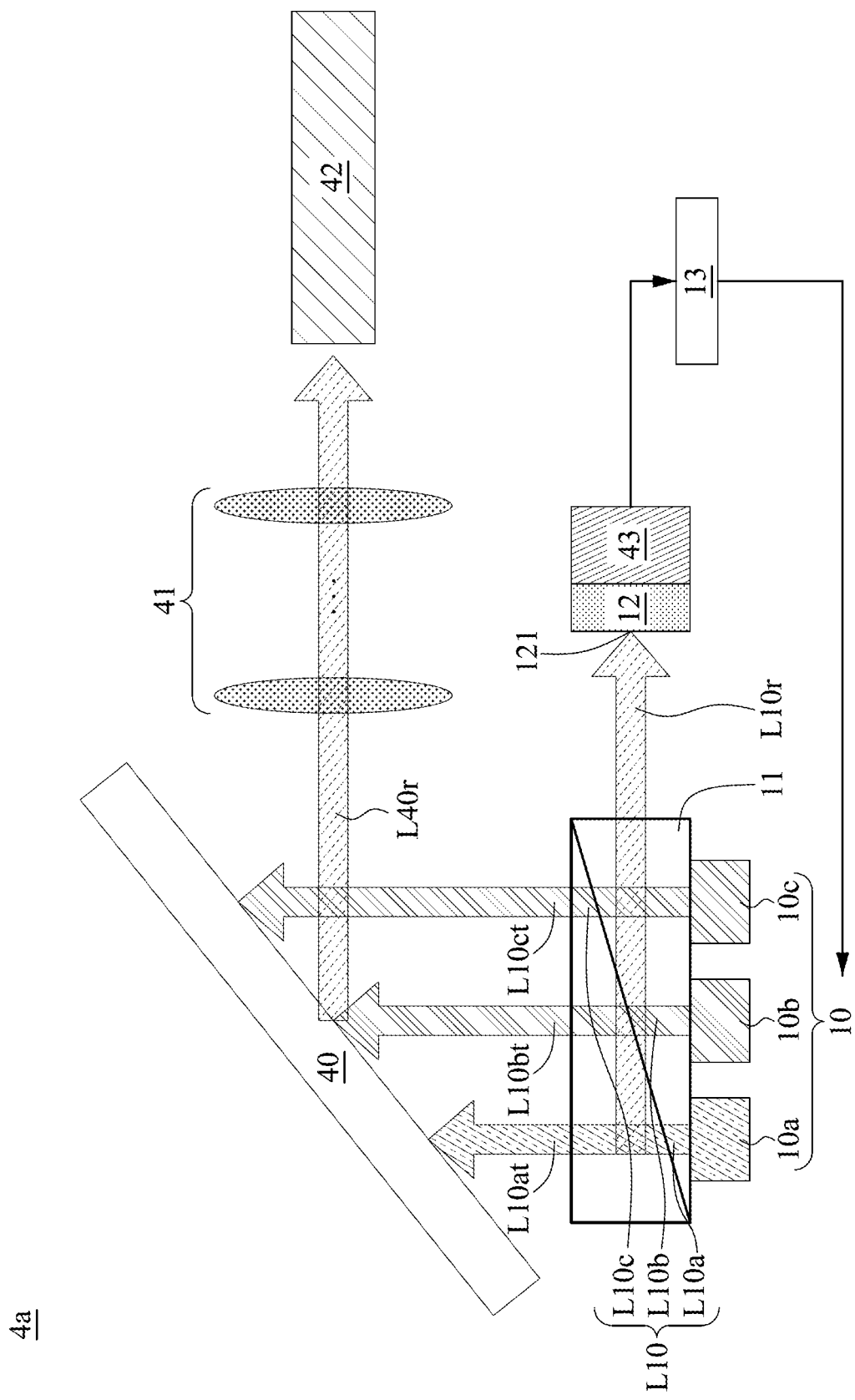
FIG. 4A illustrates a conceptual view of an optical module in accordance with some arrangements of the present disclosure.

FIG. 4A illustrates a conceptual view of an optical module 4a in accordance with some arrangements of the present disclosure. The optical module 4a is similar to the optical module 1a in FIG. 1A except for the differences described as follows.

The optical emitter 10 of the optical module 4a further includes a scanning member 40, one or more optical components 41, a waveguide 42, and a processor 43.

The optical emitter 10 in FIG. 4A includes three light sources or pixels 10a, 10b, and 10c. The light sources 10a, 10b, and 10c may respectively be configured to emit the light beams L10a, L10b, and L10c. In some arrangements, the light beams L10a, L10b, and L10c may be different in one or more properties, such as luminous flux (or luminous power or brightness), luminous intensity, propagation direction, wavelength (or frequency, or bandwidth), polarization state, etc. For example, the light beams L10a, L10b, and L10c may respectively include red, blue, and green light. In some arrangements, the light sources 10a, 10b, and 10c may be controlled by the controller 13 (or another controller not illustrated in FIG. 4A) to emit the light beams L10a, L10b, and L10c concurrently, sequentially, or periodically.

In some arrangements, the optical module 4a may include a structured light projector. For example, the optical module 4a may include a diffractive optical unit (such as a grating) switchable between a non-diffracting and a diffracting state. The diffractive optical unit may be configured and operable as a beam shaper for the light beams L10a, L10b, and L10c to create or project structured illumination or structured light patterns. For augmented reality (AR) applications, the structured light projector may help superimpose the virtual image viewed by the user over the real world seamlessly.

The optical component 11 may be disposed over or on the light source 10a, 10b, and 10c. In some other arrangements, the optical module 4a may include three optical components, each disposed over or on the light source 10a, 10b, and 10c, correspondingly.

In some arrangements, the light beams L10a, L10b, and L10c may be transmitted and/or reflected by different portions of the coating 11c of the optical component 11. The different portions of the coating 11c of the optical component 11 may have different characteristics, such as different thickness, different material, different coverage, etc. The characteristics of the different portions of the coating 11c of the optical component 11 may be designed or adjusted according to the one or more properties of the light beams L10a, L10b, and L10c. In some arrangements, the reflected proportion or percentage of the light beams L10a, L10b, and L10c may be combined into an optical beam or optical path L10r and propagate to the optical receiver 12.

As stated, the processor 43 may include a spectrum chip, a silicon-photonic chip, silicon-based integrated circuits, etc. The processor 43 may pass (or be transparent to) light beams having one or more predetermined wavelengths (or wavelengths of interest) and block the others. The processor 43 may restrict light beams received by the optical receiver 12.

For example, the processor 43 may pass the light beam L10a and block the light beams L10b and L10c during a first time interval to monitor the light beam L10a during the first time interval. Then, the processor 43 may pass the light beam L10b and block the light beams L10a and L10c during a second time interval to monitor the light beam L10b during the second time interval. After that, the processor 43 may pass the light beam L10c and block the light beams L10a and L10b during a third time interval to monitor the light beam L10b during the third time interval. The operations in the first, second, and third time intervals may be predetermined as logic or instructions implemented by the controller 13.

In some other arrangements, the processor 43 may be omitted and the light sources 10a, 10b, and 10c may be controlled (such as turned-on and/or turned-off) by the controller 13 (or another controller not illustrated in FIG. 4A) to emit the light beams L10a, L10b, and L10c in a time division manner. Therefore, the light beams L10a, L10b, and L10c can be received by the optical receiver 12 and monitored during different time intervals.

According to some arrangements of the present disclosure, for display applications shown in FIGS. 4A thru 4D, if the electrical signals from the optical receiver 12 indicate that the luminous flux of the light beam L10r exceeds a threshold value, the luminous flux of the light beam L10 can be decreased at the appropriate time or immediately to protect eyes and to improve the safety without cutting off the power of the optical emitter 10.

In addition, the wavelength(s) of each of the light beams L10a, L10b, and L10c can be monitored. For example, if the electrical signals from the optical receiver 12 indicate that the wavelength(s) of each of the reflected proportion or percentage of the light beams L10a, L10b, and L10c is out of a predetermined range, the wavelength(s) of each of the light beams L10a, L10b, and L10c can be increased or decreased at the appropriate time or immediately to improve the display fidelity.

The light beams (such as the light beams L10at, L10bt, and L10ct) transmitted through the optical component 11 may be received by the scanning member 40. The scanning member 40 may include a MEMS (Micro Electro-Mechanical System) and one or more micromirrors. For example, the MEMS may move (such as rotate) the micromirror. For example, the MEMS may be configured to scan the incident light beams horizontally and vertically. For example, the MEMS may be configured to two-dimensionally scan the incident light beams.

The incident light beams may be converted into a two-dimensional image, whereby virtual pixels are generated. The light beam L40r from the virtual pixels may pass through the one or more optical components 41. The optical component 41 may include a collimating optical system. The optical component 41 may include a convex lens. The optical component 41 may be configured to convert the light beam L40r from the virtual pixels into parallel light beams. In some other arrangements, the optical component 41 may further include a prism, a concave lens, a flat surface, a diffuser, a shutter, a filter, a holographic element, etc.

The waveguide 42 may include one or more diffraction grating members (not illustrated in the figures). The parallel light beams may enter the waveguide 42 through a diffraction grating member thereof, propagate in the waveguide 42 by total reflection, and emit from the waveguide 42 through another diffraction grating member thereof.

In some arrangements, the waveguide 42 may propagate light of more than one wavelength or color. In some arrangements, the waveguide 42 may propagate infrared light. In some arrangements, the light beams emitted from the waveguide 42 may propagate toward a field of view (FOV) of an optical sensitive organ (such as eyes) and be viewed by the user as a virtual image. The virtual image may be superimposed over the real world as an augmented reality. According to some arrangements of the present disclosure, the waveguide 42 offers the advantages of transparent, thin form factors and low cost fabrication.

Figure 4B:
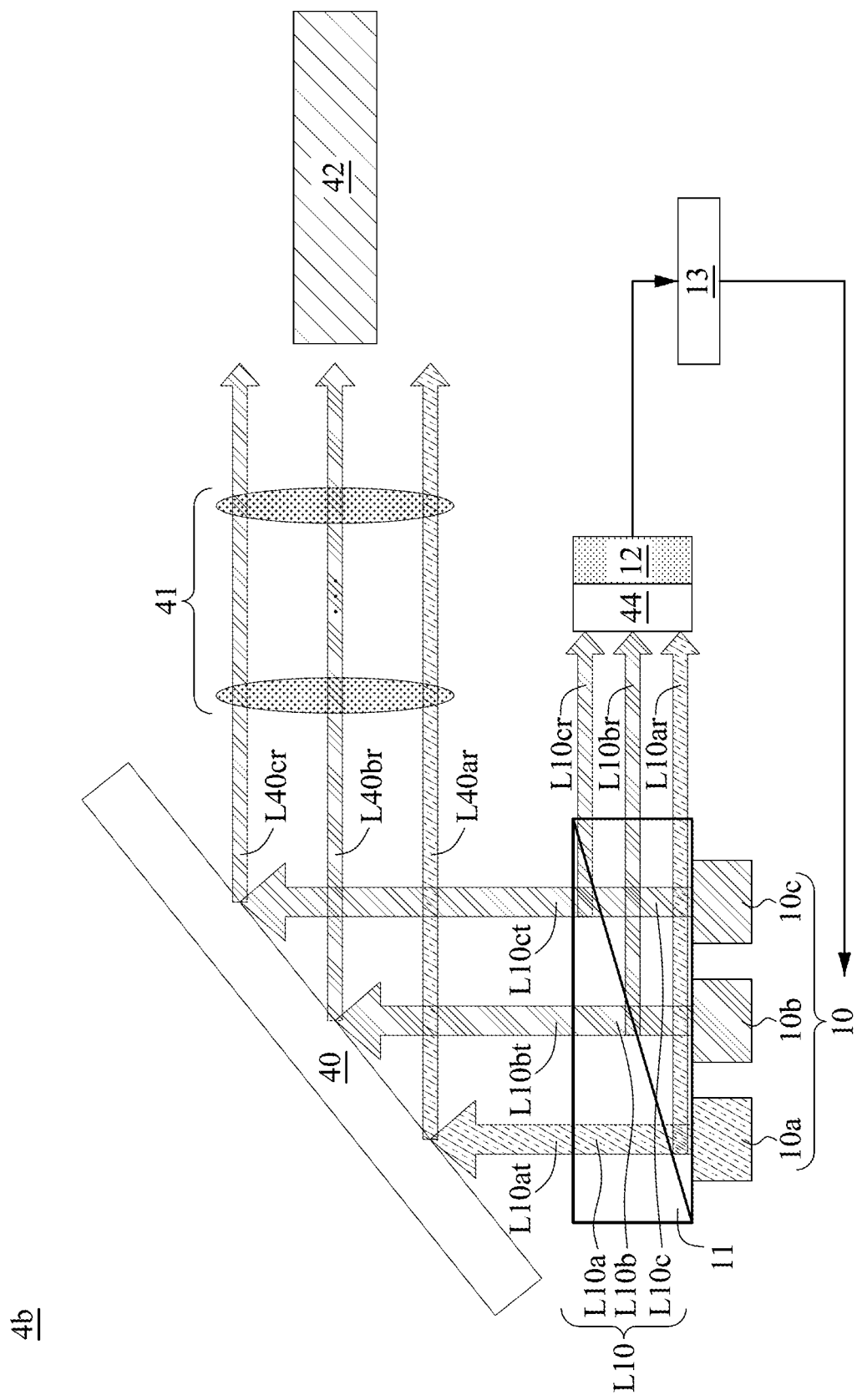
FIG. 4B illustrates a conceptual view of an optical module in accordance with some arrangements of the present disclosure.

FIG. 4B illustrates a conceptual view of an optical module 4b in accordance with some arrangements of the present disclosure. The optical module 4b is similar to the optical module 4a in FIG. 4A except for the differences described as follows.

In some arrangements, the reflected proportion or percentage of the light beams L10a, L10b, and L10c may not combine into an optical beam or optical path. For example, the light beams L10ar, L10br, and L10cr are received at different locations on the active surface 121 of the optical receiver 12. In some arrangements, the distances between gaps among the light sources 10a, 10b, and 10c of the optical emitter 10 in FIG. 4B may be greater than that in FIG. 4A.

As stated, the filter 44 may include an optical bandpass filter, a polarization filter, a spectrally selectively transparent component, etc. The filter 44 may pass (or be transparent to) light beams having one or more predetermined wavelengths (or wavelengths of interest) and block the others. The filter 44 may restrict light beams received by the optical receiver 12.

In some other arrangements, the filter 44 may be omitted and the light sources 10a, 10b, and 10c may be controlled (such as turned-on and/or turned-oft) by the controller 13 (or another controller not illustrated in FIG. 4B) to emit the light beams L10a, L10b, and L10c in a time division manner. Therefore, the light beams L10a, L10b, and L10c can be received by the optical receiver 12 and monitored during different time intervals.

In some arrangements, there may be multiple light beams L40ar, L40br, and L40cr from the virtual pixels generated by the scanning member 40. In some arrangements, the light beams L40ar, L40br, and L40cr may include different wavelengths or different colors.

Figure 4C:
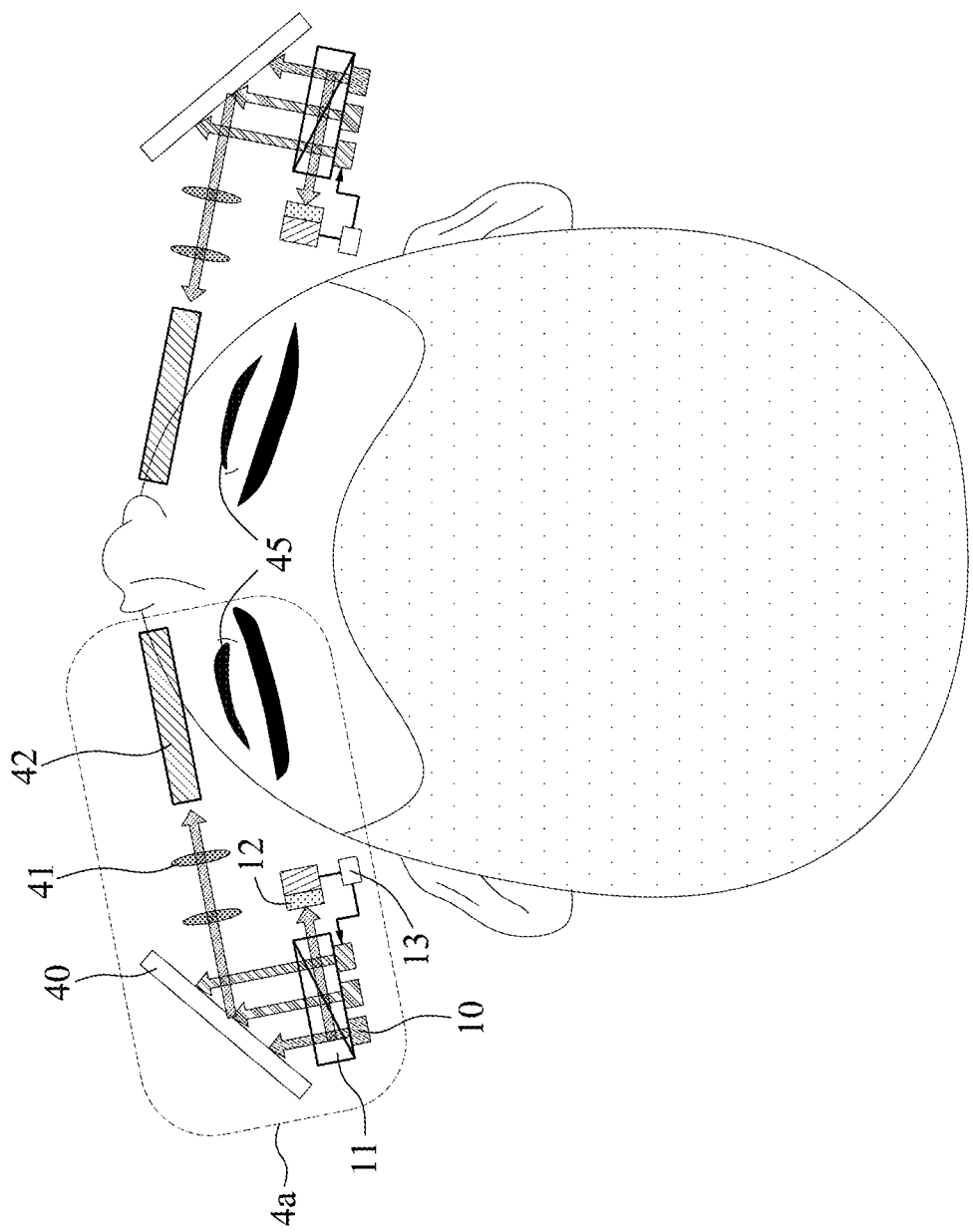
FIG. 4C illustrates a conceptual view showing a state in which a user wears a wearable device including an optical module in accordance with some arrangements of the present disclosure.

FIG. 4C illustrates a conceptual view showing a state in which a user wears a wearable device including the optical module 4a in accordance with some arrangements of the present disclosure.

In some arrangements, the light beams emitted from the waveguide 42 may be guided to the FOV of the eyes 45 of the user and viewed by the user as a virtual image. The virtual image may be superimposed over the real world as an augmented reality.

Figure 4D:
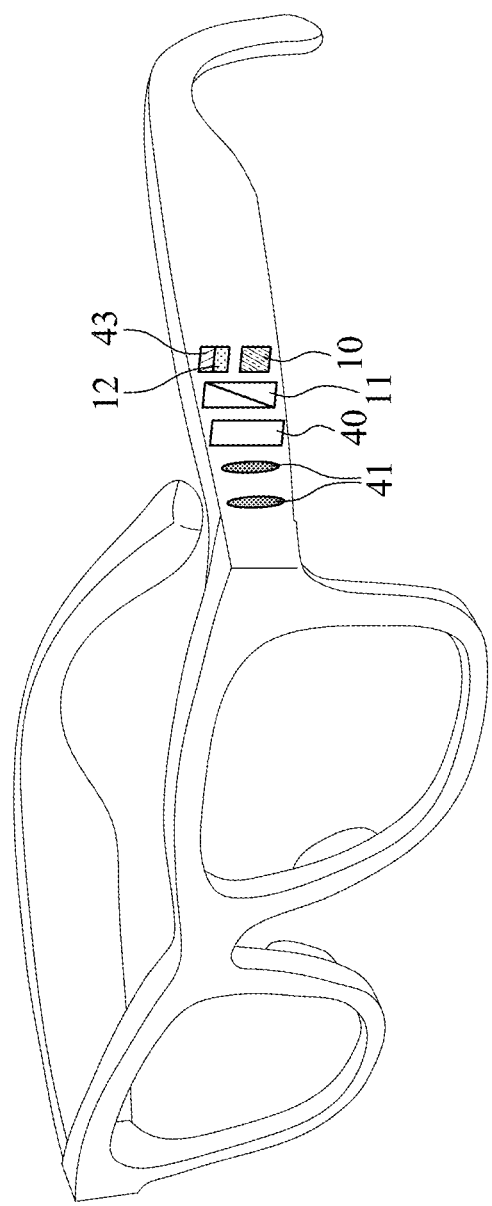
FIG. 4D illustrates a perspective view of a wearable device including an optical module in accordance with some arrangements of the present disclosure.

FIG. 4D illustrates a perspective view of a wearable device 4d including the optical module 4a in accordance with some arrangements of the present disclosure.

In some arrangements, the wearable device 4d may include smart glasses, head mounted displays (HMDs), or another smart wearable device. For ease of description, only the smart glasses are used as an example for specific descriptions in specific arrangements of the present invention. Configuration or application of the optical module 4a in the figures is for illustrative purposes only, and not intended to limit the present disclosure.

Although FIG. 4D illustrates a traditional eyeglass shaped frame assembly, arrangements of the present invention are applicable to a wide variety of frame types and styles. For example, lower lens supports may be omitted, upper lens supports may be omitted, the frame may assume a visor-like shape, headband, goggles, etc.

The components or units of the optical module 4a may be integrated in or mounted on the structural frame members of the wearable device 4d. For example, one or more of the optical emitter 10, the optical component 11, the optical receiver 12, the controller 13, the scanning member 40, the one or more optical components 41, or the waveguide 42 may be integrated in or mounted on the temples of the wearable device 4d.

Figure 5A:
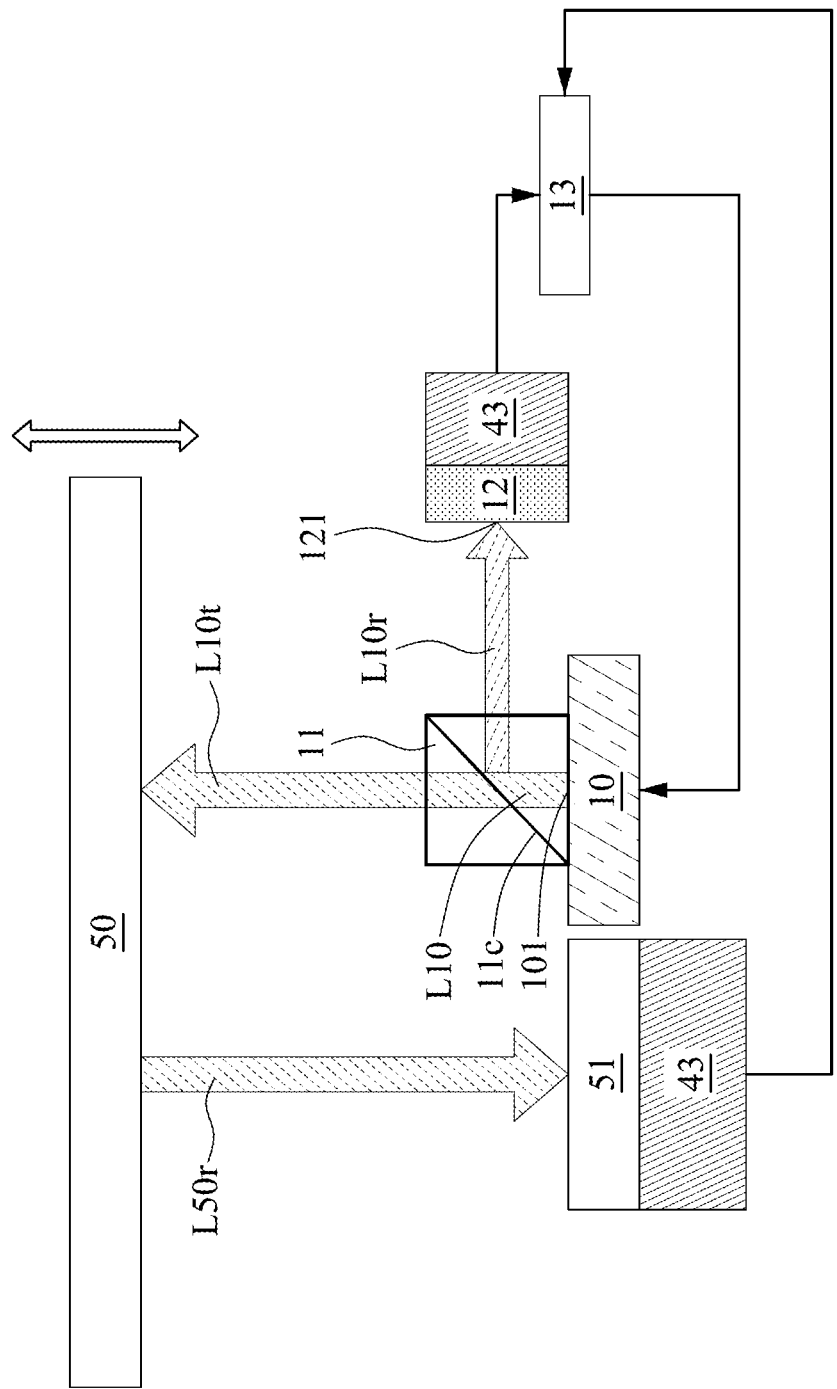
FIG. 5A illustrates an interactive diagram of an optical module and an object according to some arrangements of the present disclosure.

FIG. 5A illustrates an interactive diagram of an optical module 5a and an object 50 according to some arrangements of the present disclosure.

The optical module 5a may include a LiDAR system. The light beam (such as the light beam L10t) transmitted through the optical component 11 may be received by (or may radiate) the object 50. The object 50 may include any suitable object that is moving or stationary relative to the optical module 5a. The object 50 may scatter or reflect at least a portion of light from the light beam L10t, and the scattered or reflected light beam L50r may return toward the optical module 5a and be received by an optical receiver 51.

The optical receiver 51 may be similar to the optical receiver 12 of FIG. 1A. Therefore, some details of the optical receiver 51 may correspond to the paragraphs described above for FIG. 1A, and a description thereof is not repeated hereinafter for conciseness.

The controller 13 may include a processor, computing system (e.g., an ASIC or FPGA), or other suitable circuitry configured to analyze one or more characteristics of electrical signals from the optical receiver 51 to determine one or more characteristics of the object 50, such as its distance downrange from the optical module 5a. This can be done, for example, by analyzing the time of flight or phase modulation for the light beam L10 emitted from the optical emitter 10.

The controller 13 may control the optical emitter 10 based on the electrical signals from the optical receiver 12 and/or the optical receiver 51.

For example, a threshold value (or a desired value) for the luminous flux of the light beam L10r may be predetermined. If the electrical signals from the optical receiver 12 indicate that the luminous flux of the light beam L10r exceeds the threshold value, the controller 13 may generate logic or instructions to adjust or to calibrate (such as to decrease) the luminous flux of the light beam L10. Additionally, if the electrical signals from the optical receiver 12 indicate that the luminous flux of the light beam L10r is too low (or lower than an acceptable value), the controller 13 may generate logic or instructions to adjust (such as to increase) the luminous flux of the light beam L10.

Similarly, a threshold value (or a desired value) for the luminous flux of the light beam L50r may be predetermined. If the electrical signals from the optical receiver 51 indicate that the luminous flux of the light beam L50r exceeds the threshold value, the controller 13 may generate logic or instructions to adjust or to calibrate (such as to decrease) the luminous flux of the light beam L10. Additionally, if the electrical signals from the optical receiver 51 indicate that the luminous flux of the light beam L50r is too low (or lower than an acceptable value), the controller 13 may generate logic or instructions to adjust (such as to increase) the luminous flux of the light beam L10.

According to some arrangements of the present disclosure, the light beam L10 can be adjusted according to the light beam L10r and the light beam L50r at the appropriate time or immediately. By continuously monitoring the light beam L10r and the light beam L50r, ageing effects may be compensated for by an appropriately modified control of the optical emitter 10.

Figure 5B:
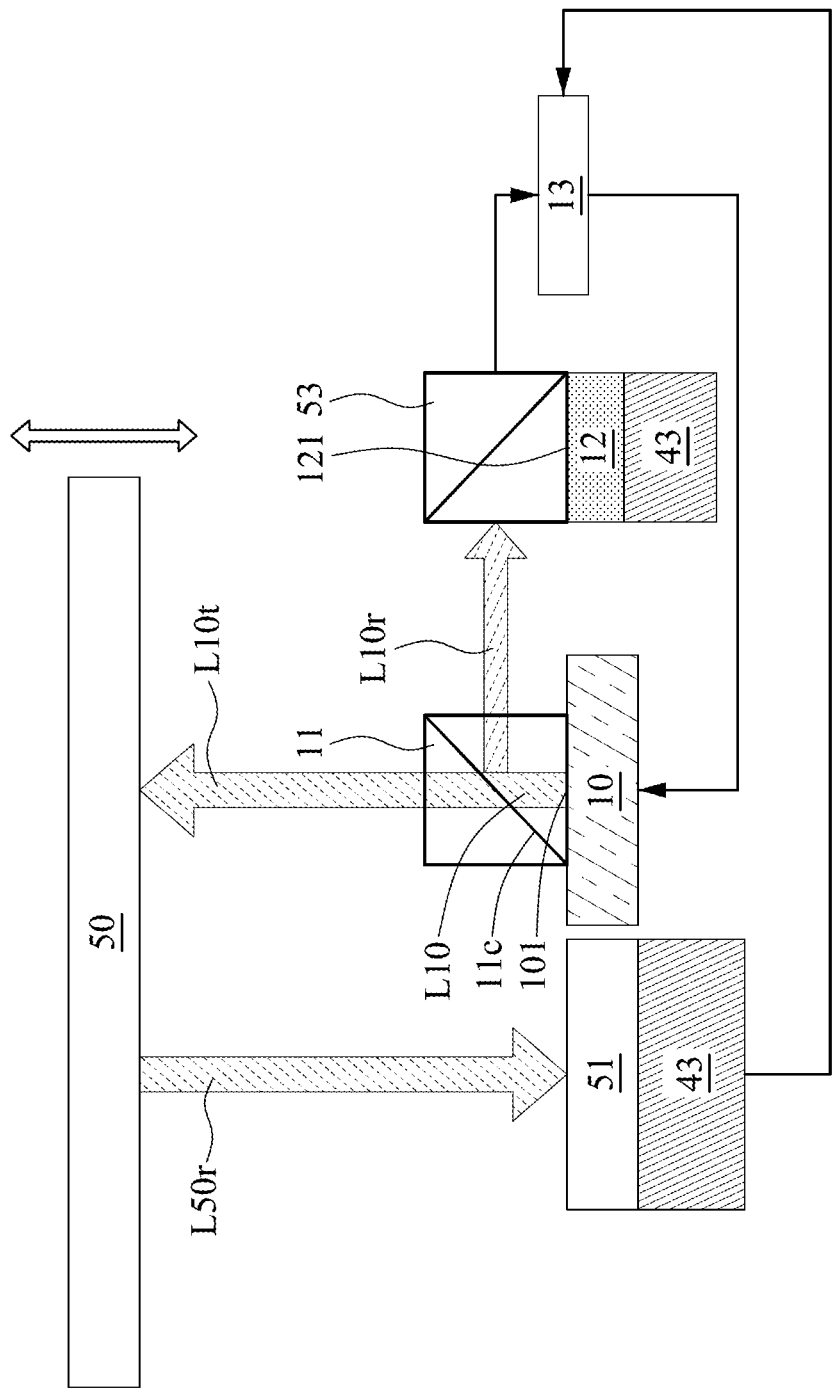
FIG. 5B illustrates an interactive diagram of an optical module and an object according to some arrangements of the present disclosure.

FIG. 5B illustrates an interactive diagram of an optical module 5b and the object 50 according to some arrangements of the present disclosure. The optical module 5b is similar to the optical module 5a in FIG. 5A except for the differences described as follows.

The optical module 5b further includes an optical component 53. The optical component 53 may be similar to the optical component 11 of FIG. 1A. Therefore, some details of the optical component 53 may correspond to the paragraphs described above for FIG. 1A, and a description thereof is not repeated hereinafter for conciseness.

The optical component 53 may be disposed in front of the active surface 121 of the optical receiver 12. The active surface 121 of the optical receiver 12 and the active surface 101 of the optical emitter 10 may face in the same direction. The optical component 53 may receive the light beam (such as the light beam L10r) reflected by the optical component 11. A proportion or percentage of the light beam L10r may be transmitted through the optical component 53 and another proportion or percentage of the light beam L10r may be reflected toward the optical receiver 12.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to 5%, less than or equal to ±4%, less than or equal to 3%, less than or equal to 2%, less than or equal to ±1%, less than or equal to f0.5%, less than or equal to +0.1%, or less than or equal to +0.05%. For example, two numerical values can be deemed to be "substantially" the same or equal if a difference between the values is less than or equal to ±10% of an average of the values, such as less than or equal to ±5%, less than or equal to 4%, less than or equal to 3%, less than or equal to 2%, less than or equal to 1%, less than or equal to 0.5%, less than or equal to 0.1%, or less than or equal to ±0.05%. For example, "substantially" parallel can refer to a range of angular variation relative to 0° that is less than or equal to 10°, such as less than or equal to 5°, less than or equal to ±4°, less than or equal to ±3°, less than or equal to ±2°, less than or equal to ±10, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to 5°, less than or equal to 4°, less than or equal to ±3°, less than or equal to ±2°, less than or equal to ±1°, less than or equal to +0.5°, less than or equal to 0.1°, or less than or equal to 0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific arrangements thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical module, comprising:
   a carrier;
   an optical emitter disposed over the carrier;
   a monitor disposed over the carrier and configured to adjust a property of a first light emitted from the optical emitter;
   a first optical component configured to receive the first light and radiate a second light and a third light, wherein the monitor comprises a first optical receiver and a controller, and wherein the first optical receiver is configured to receive the second light and generate an electrical signal to the controller, and the controller is configured to adjust the property of the first light emitted from the optical emitter based on the electrical signal;
   a second optical receiver configured to receive a reflected light of the third light from an object, wherein the monitor is configured to adjust the property of the first light emitted from the optical emitter so as to keep a property of the reflected light within a predetermined range.

2. The optical module of claim 1, wherein the monitor is configured to adjust the property of the first light by generating an instruction to adjust an electrical current or voltage provided to the optical emitter.

3. The optical module of claim 1, wherein the first optical component is movable relative to the optical emitter and configured to adjust a proportion of the second light and the third light.

4. The optical module of claim 1, wherein the first light comprises a plurality of different wavelengths, and wherein the monitor receives the second light and configured to adjust a property of each wavelength of the first light.

5. The optical module of claim 4, further comprising:
   a waveguide configured to direct the third light to an optical sensitive organ.

6. The optical module of claim 5, wherein the first optical component is configured to receive the first light with different wavelengths during different time intervals.

7. An optical module, comprising:
   an optical emitter configured to emit a first light;
   an optical receiver configured to receive a second light and generate an electrical signal for controlling the optical emitter, wherein the second light is a part of the first light;
   a first optical component configured to receive the first light and split the first light into the second light and a third light; and
   a second optical component configured to alter a polarization state of the first light, wherein the first optical component and the second optical component are collectively configured to adjust a property of the third light.

8. The optical module of claim 7, further comprising:
   a second optical receiver configured to receive a reflected light of the third light from an object.

9. The optical module of claim 7, wherein a luminous flux of the second light is lower than a luminous flux of the first light.

* * * * *